United States Patent [19]

Hopkins

[11] Patent Number: 4,836,857

[45] Date of Patent: Jun. 6, 1989

[54] ASPHALT ADDITIVE COMPOSITIONS

[75] Inventor: David L. Hopkins, Mentor on the Lake, Ohio

[73] Assignee: The Lubrizol Corporation, Wickliffe, Ohio

[21] Appl. No.: 24,299

[22] Filed: Mar. 9, 1987

[51] Int. Cl.$^4$ ............................................. C08L 75/00
[52] U.S. Cl. .............................. 106/284.4; 106/225; 106/229; 106/284.06
[58] Field of Search ............... 106/273 N, 277, 281 N, 106/225, 229, 284.4, 284.06

[56] References Cited

U.S. PATENT DOCUMENTS

| | | | |
|---|---|---|---|
| 2,919,204 | 12/1959 | Dybalski et al. | 106/269 |
| 3,868,263 | 2/1975 | McConnaughay | 106/281 |
| 4,036,661 | 7/1977 | Schmidt | 106/273 N |
| 4,234,346 | 11/1980 | Latta, Jr. et al. | 106/281 R |
| 4,238,241 | 12/1980 | Schneider | 106/281 R |
| 4,331,481 | 5/1982 | Schneider | 106/283 |
| 4,410,367 | 10/1983 | LeGrand | 106/308 N |
| 4,450,011 | 5/1984 | Schilling et al. | 106/269 |
| 4,547,224 | 10/1985 | Schilling | 106/273 |

FOREIGN PATENT DOCUMENTS 125852 11/1984 European Pat. Off. .

*Primary Examiner*—A. Lionel Clingman
*Assistant Examiner*—Christine A. Skane
*Attorney, Agent, or Firm*—James L. Cordek; Robert A. Franks; Joseph P. Fischer

[57] ABSTRACT

Asphalt additive compositions are described which comprise (A) a metallic organic strength improving compound and (B) an anti-strip compound. The metal of said metallic organic compound is selected from the group consisting of manganese, cobalt, copper, vanadium, molybdenum, cerium, iron, nickel, lead, zirconium, barium, calcium and zinc. The preferred metal is manganese. The anti-strip compound is designed to reduce water-induced damage to asphalt paving mixtures.

32 Claims, No Drawings

ASPHALT ADDITIVE COMPOSITIONS

BACKGROUND OF THE INVENTION

1. Field of the Invention

This invention relates to asphalt additive compositions and more particularly to asphalt additive compositions comprising (A) an asphalt soluble metallic organic strength improving compound either alone or in combination with other metallic organic compounds and (B) an anti-strip compound wherein said anti-strip compound is present in a concentration of at least 10 weight percent. The asphalt additive compositions are useful, particularly in preparing improved asphalt concrete compositions with improved water resistance and strength improvement.

The term "asphalt" or "asphalt cement" as used in the description of the present application refers to any of a variety of solid or semi-solid materials at room temperature which gradually liquify when heated, and in which the predominant constituents are naturally occurring bitumens of which are obtained as residue in petroleum refining. Asphalt is further defined by Kirk-othmer, Encyclopedia of Chemical Technology, Vol. 3, Third Ed. (1978) pp. 284–327, John Wiley & Sons, New York. An additional discussion appears in the publication entitled "A Brief Introduction to Asphalt and some of its Uses", Manual Series No. 5 (MS-5), The Asphalt Institute, 7th Ed., September. 1974. Both of these references are hereby incorporated by reference.

Asphalt cements have found particular utility when combined with aggregates. Such combinations, generally referred to as "asphalt concrete", are employed extensively as paving compositions for roads, driveways, parking lots, airport runways, etc. The asphalt is converted to a fluid state when paving a road. One fluid form is the suspension or emulsion of the asphalt in water. After spreading and compressing the aggregate-containing asphalt, water evaporates or separates, and the asphalt hardens into a continuous mass. Another form of asphalt employed in road construction is a cut-back, i.e., a liquid petroleum product produced by fluxing an asphaltic base with a suitable organic solvent or distillate. A road is formed by paving the aggregate-containing cutback and evaporating the volatile distillate from the mass. An advantage of using the above road construction techniques is the avoidance of high temperature application. In an alternative and most widely used technique, the asphalt and aggregate can be mixed and applied at elevated temperatures at the fluid state of the asphalt to form the road. This form of asphalt, which is neither cut-back nor emulsified generally is referred to as asphalt cement.

2. Description of the Related Art

U.S. Pat. No. 4,410,367 (LeGrand, Oct. 18, 1983) describes a method for enhancing the resistance of aggregate to the effects of atmospheric degradation and improve its ability to resist separation, from cured asphalt concrete when incorporated into asphalt cement prior to cure to reinforce the resulting asphalt concrete mixture. This mixture is achieved by treating the aggregate with an aqueous polyelectrolyte surfactant and thereafter allowing the treated aggregate to dry by heating or exposure to ambient conditions.

U.S. Pat. No. 3,868,263 (McConnaughy, Feb. 25, 1975) is directed to a method of forming a paving composition in which an aggregate is mixed with a primary bituminous binder containing a bituminous material as an adhesion promoter to form a premix of binder coated aggregate. After the binder in the premix is cured the premix is mixed with a secondary bituminous binder to form a paving composition which can be stock piled or stored for later use without being subjected to deterioration as by rain or weathering.

SUMMARY OF THE INVENTION

This invention is directed toward asphalt additive compositions and more particularly to asphalt additive compositions comprising (A) an asphalt soluble metallic organic strength improving compound either alone or in combination with other metallic organic compounds and (B) an anti-strip compound wherein said anti-strip compound is present in a concentration of at least 10 weight percent.

DETAILED DESCRIPTION OF THE INVENTION

The present invention relates to asphalt additive compositions which when combined with asphalt cement imparts improved water resistance and strength improvement.

The asphalts which can be treated in accordance with the compositions of this invention include natural asphalts and petroleum asphalts which are generally known for roofing and paving applications. The natural asphalt includes, for example, asphaltite such as gilsonite, grahamite and glance pitch; lake asphalt such as trinidad asphalt; and rock asphalt. The petroleum asphalts include straight asphalt obtained by distillation of a crude oil (unblown and substantially unoxidized), blown asphalt produced by blowing an oxygen-containing gas into a straight asphalt in the presence or absence of a catalyst, solvent-extracted asphalt obtained when asphaltic material is separated from the petroleum fraction containing it by the use of propane or other solvents, and cut-back asphalt which is a mixture of straight asphalt and a light petroleum solvent. The petroleum tars that may be modified include oil gas tar obtained as a by-product when gases are produced from petroleum fractions, such tar in refined form, cut-back tar obtained by mixing a light petroleum fraction with such tar, and tar pitch obtained as a residue by removing the volatile fraction from such tar. Any of these kinds of asphalt may be used singly or jointly. Straight asphalt is preferred for paving applications and oxidized and blown asphalts are preferred for roofing applications.

As used herein, the term "asphalt cement" refers to any of a variety of substantially unblown or unoxidized solid or semi-solid materials at room temperature which gradually liquify when heated. Its predominant constituents are bitumens, which may be naturally occurring or obtained as the residue of refining processing. The asphalt cements are generally characterized by a penetration (PEN, measured in tenths of a millimeter, dmm) of less than 400° at 25° C., and a typical penetration is between 40 and 300 (ASTM Standard, Method D-5). The viscosity of asphalt cement at 60° C. is more than about 65 poise.

Asphalt cements are often defined in terms specified by the American Association of State Highway Transportation Officials (AASHTO) AR viscosity system. Two sets of typical specifications are as follows:

| TEST | AASHTO M-226 | | | | | |
|---|---|---|---|---|---|---|
| | AC 2.5 | AC 5 | AC 10 | AC 20 | AC 30 | AC 40 |
| Viscosity @ 140° F., poise (AASHTO T-202) | 250 ± 50 | 500 ± 100 | 1000 ± 200 | 2000 ± 400 | 3000 ± 600 | 4000 ± 800 |
| Viscosity @ 275° F., cSt, minimum (AASHTO T-201) | 125 | 175 | 250 | 300 | 350 | 400 |
| Pen. @ 77° F., minimum (AASHTO T-49) | 220 | 140 | 80 | 60 | 50 | 40 |
| Flash Point, COC Minimum °F. | 325 | 350 | 425 | 450 | 450 | 450 |
| Ductility After TFOT (AASHTO T-179) @ 77° F., 5 CM/MIN, minimum | 100 | 100 | 75 | 50 | 40 | 25 |
| Viscosity After TFOT (AASHTO T-179) @ 140° F., poise minimum | 1000 | 2000 | 4000 | 8000 | 12000 | 16000 |

| TEST | AR1000 | AR2000 | AR4000 | AR8000 | AR16000 |
|---|---|---|---|---|---|
| Viscosity @ 140° F., poise (AASHTO T-202) | 1000 ± 250 | 2000 ± 500 | 4000 ± 1000 | 8000 ± 2000 | 16000 ± 4000 |
| Viscosity @ 275° F., cSt, minimum (AASHTO T-201) | 140 | 200 | 275 | 400 | 500 |
| Pen. @ 77° F., minimum (AASHTO T-49) | 65 | 40 | 25 | 20 | 20 |
| Percent of Original Pen. @ 77° F., minimum | — | 40 | 45 | 50 | 52 |
| Ductility @ 77° F., minimum, 5 cm/min | 100 | 100 | 75 | 75 | 75 |

Component (A)

Component (A) of this invention is a metallic organic strength improving compound preferably an asphalt soluble metallic organic strength improving compound wherein the metal of said metallic organic compound is selected from the group consisting of manganese, cobalt, copper, vanadium, molybdenum, cerium, iron, nickel, lead, zirconium, barium, calcium and zinc. The preferred metal is manganese.

The organic manganese compound may be used in its different valence states (e.g., +2, +3 or higher). Mixtures of manganese with organic cobalt or copper compounds or other metal ions may also be used.

The organic compounds may be unsubstituted or substituted (e.g., with sulfur, particularly sulfonates, or with phosphorus, particularly, phosphates). Suitable anions for the organic-manganese compound are derived from carboxylic acids, alcohols, phenols, and ketones.

The carboxylic acids suitable for use in this invention can be made include aliphatic, cycloaliphatic, and aromatic mono- and polybasic carboxylic acids such as the napthenic acids, alkyl- or alkenyl-substituted cyclopentanoic acids, alkyl- or alkenyl-substituted cyclohexanoic acids, and alkyl- or alkenyl-substituted aromatic carboxylic acids. The aliphatic acids generally contain at least 8 carbon atoms and preferably at least 12 carbon atoms. Usually they have no more than about 400 carbon atoms. Generally, if the aliphatic carbon chain is branched, the acids are more oil-soluble for any given carbon atoms content. The cycloaliphatic and aliphatic carboxylic acids can be saturated or unsaturated. Specific examples include 2-ethylhexanoic acid, alpha-linolenic acid, propylene-tetramer-substituted maleic acid, behenic acid, isostearic acid, pelargonic acid, capric acid, palmitoleic acid, linoleic acid, lauric acid, oleic acid, ricinoleic acid, undecylic acid, dioctylcyclopentane carboxylic acid, myristic acid, dilauryldecahydronaphthalene carboxylic acid, stearyl-octahydroindene carboxylic acid, palmitic acid, commercially available mixtures of two or more carboxylic acids such as tall oil acids, rosin acids, and the like.

A typical group of oil-soluble carboxylic acids useful in preparing the salts used in the present invention are the oil-soluble aromatic carboxylic acids. These acids are represented by the general formula:

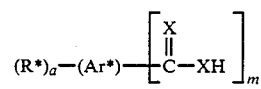

I wherein R* is an aliphatic hydrocarbon-based group of at least 4 carbon atoms, and no more than about 400 aliphatic carbon atoms, a is an integer from one to four, Ar* is a polyvalent aromatic hydrocarbon nucleus of up to about 14 carbon atoms, each X is independently a sulfur or oxygen atom, and m is an integer of from one to four with the proviso that R* and a are such that there is an average of at least 8 aliphatic carbon atoms provided by the R* groups for each acid molecule represented by Formula I. Examples of aromatic nuclei represented by the variable Ar* are the polyvalent aromatic radicals derived from benzene, napthalene anthracene, phenanthrene, indene, fluorene, biphenyl, and the like. Generally, the radical represented by Ar* will be a polyvalent nucleus derived from benzene or naphthalene such as phenylenes and naphthylene, e.g., methyphenylenes, ethoxyphenylenes, nitrophenylenes, isopropylenes, hydroxyphenylenes, mercaptophenylenes, N,N-diethylaminophenylenes, chlorophenylenes, N,N-diethylaminophenylenes, chlorophenylenes, dipropoxynaphthylenes, triethylnaphthylenes, and similar tri-, tetra-, pentavalent nuclei thereof, etc.

The R* groups are usually hydrocarbyl groups, preferably groups such as alkyl or alkenyl radicals. However, the R* groups can contain small number substituents such as phenyl, cycloalkyl (e.g., cyclohexyl, cyclopentyl, etc.) and nonhydrocarbon groups such as nitro, amino, halo (e.g., chloro, bromo, etc.), lower alkoxy, lower alkyl mercapto, oxo substituents (i.e., =O), thio groups (i.e., =S), interrupting groups such as —NH—, —O—, —S—, and the like provided the essentially hydrocarbon character of the R* group is retained. The hydrocarbon character is retained for purposes of this invention so long as any non-carbon atoms present in the R* groups do not account for more than about 10% of the total weight of the R* groups.

Examples of R* groups include butyl, isobutyl, pentyl, octyl, nonyl, dodecyl, docosyl, tetracontyl, 5-chlorohexyl, 4-ethoxypentyl, 4-hexenyl, 3-cyclohexyloctyl, 4-(p-chlorophenyl)-octyl, 2,3,5-trimethylheptyl, 4-ethyl-5-methyloctyl, and substituents derived from polymerized olefins such as polychloroprenes, polyethylenes, polypropylenes, polyisobutylenes, ethylene-propylene copolymers, chlorinated olefin polymers, oxidized ethylene-propylene copolymers, and the like. Likewise, the group Ar* may contain non-hydrocarbon substituents, for example, such diverse substituents as lower alkoxy, lower alkyl mercapto, nitro, halo, alkyl or alkenyl groups of less than 4 carbon atoms, hydroxy, mercapto, and the like.

Another group of useful carboxylic acids are those of the formula:

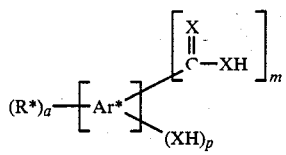

wherein R*, X, Ar*, m and a are as defined in Formula I and p is an integer of 1 to 4, usually 1 or 2. Within this group, an especially preferred class of oil-soluble carboxylic acids are those of the formula:

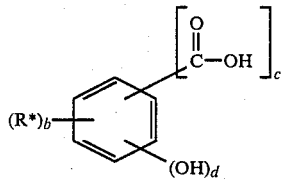

wherein R* is defined as in Formula I, b is an integer of from 1 to 3, c is 1 or 2, d is zero, 1, or 2 and preferably 1 with the proviso that R* and b are such that the acid molecules contain at least an average of about 12 aliphatic carbon atoms in the aliphatic hydrocarbon substituents per acid molecule. And within this latter group of oil-soluble carboxylic acids, the aliphatic-hydrocarbon substituted salicyclic acids wherein each aliphatic hydrocarbon substituent contains an average of at least about 16 carbon atoms per substituent and 1 to 3 substituents per molecule are particularly useful. Salts prepared from such salicyclic acids wherein the aliphatic hydrocarbon substituents are derived from polymerized olefins, particularly polymerized lower 1-mono-olefins such as polyethylene, polypropylene, polyisobutylene, ethylene/-propylene copolymers and the like and having average carbon contents of about 30 to about 400 carbon atoms.

The carboxylic acids corresponding to Formulae I-III above are well known or can be prepared according to procedures known in the art.

In the context of this invention, phenols are considered organic acids. Thus, salts of phenols (generally known as phenates) are also useful in making (A) of this invention are well known to those skilled in the art. The phenols from which these phenates are formed are of the general formula:

$$(R^*)_a(Ar^*)-(XH)_m \qquad \text{IV}$$

wherein R*, a, Ar*, X and m have the same meaning and preferences are described hereinabove with reference to Formula I. The same examples described with respect to Formula I also apply.

A commonly available class of phenates are those made from phenols of the general formula:

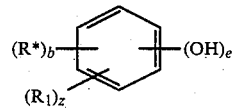

wherein b is an integer of 1-3, e is of 1 or 2, z is 0 or 1; R* in Formula V is a hydrocarbyl-based substituent having an average of from 4 to about 400 aliphatic carbon atoms and $R_1$ is selected from the group consisting of lower hydrocarbyl, lower alkoxyl, nitro, amino, cyano and halo groups.

One particular class of phenates for use in this invention are the metal sulfurized phenates made by sulfurizing a phenol as described hereinabove with a sulfurizing agent such as sulfur, a sulfur halide, or sulfide or hydrosulfide salt. Techniques for making these sulfurized phenates are described in U.S. Pat. Nos. 2,680,096; 3,036,971; and 3,775,321 which are hereby incorporated by reference for their disclosures in this regard.

Other phenates that are useful are those that are made from phenols that have been linked through alkylene (e.g., methylene) bridges. These are made by reacting single or multi-ring phenols with aldehydes or ketones, typically, in the presence of an acid or basic catalyst. Such linked phenates as well as sulfurized phenates are described in detail in U.S. Pat. No. 3,350,038; particularly columns 6-8 thereof, which is hereby incorporated by reference for its disclosures in this regard.

The ketones that are useful for the preparation of component (A) are non-volatile ketones having boiling points above 125° C. The ketones which are used in the process of this invention may be either the individual ketones or mixtures of ketones, such as those obtained from the oxidation of petroleum hydrocarbon fractions.

Ketones useful in the practice of this invention are stearone, laurone, coconone, as well as diketones such as 2,4-pentanedione, etc.

The ketones may also be obtained from oxidized petroleum fractions; such fractions may contain hydrocarbons which are saturated or unsaturated, straight or branched chain, solid or liquid, aromatic aliphatic (paraffinic) or cycloaliphatic (naphthenic). All of the above, either single or in admixture with one another, have been found to be operative in the process of this invention. More specific examples of petroleum fractions which will be used in the practice of this invention include eicosane, petrolatum, white oil, a highly unsaturated wax, a phenol-extracted aromatic fraction, scale wax, solvent-extracted mid-continent oils, etc. A cursory inspection of these petroleum fractions reveals eicosane as an example of a saturated straight chain compound, petrolatum as an example of a slightly unsaturated, branched-chain material; white oil as an example of a mixture of saturated-chain and branched-chain materials. The highly unsaturated wax was prepared by chlorination of a wax fraction, followed by dehydrochlorination, yielding a product with a bromine number in the range of about 60-75. The phenol-extracted aromatic fraction contains about 20 percent of aromatic compounds, 30 percent of naphthenic compounds, and 50 percent of paraffinic compounds. Scale wax is an example of a mixed straight and branched-chain material.

The method for forming the ketone starting materials by the oxidation of these petroleum fractions is not critical. A wide variety of oxidation methods is known and any of these may be employed. It has been found, for example, that such a simple method as allowing a sample of a petroleum fraction to be exposed to atmospheric oxygen at room temperature for a prolonged period of time gives an entirely satisfactory material for the preparation of products of this invention. It will usually be desirable to utilize oxidation processes which require less time. Such processes involve higher temperatures and at such temperatures catalysts may be employed. Thus, it has been observed that petroleum fractions may be oxidized satisfactorily at about 200° C. at a period of 4 to 12 hours. The use of oxidation catalysts allows an even shorter time.

The metallic organic strength improving compound, component (A) of this invention, is made in two steps. Step 1 produces a soap by neutralizing, for example, a tall oil fatty acid with, for example, manganese oxide ore at 96°-99° C. using water to promote the reaction. Water is then removed by heating the soap to 120° C. while passing nitrogen through the reaction mass.

EXAMPLE A-1

1000 parts of a tall oil fatty acid is added to a vessel. The contents are stirred and added are 136.7 parts of manganese oxide ore (62% Manganese), 15.9 parts water and 0.05 parts of a silicon antifoam agent. The contents are heated to 96°-99° C. over 6 hours. Nitrogen is passed below the surface while heating the contents to 120° C. to remove volatiles. 2264 parts diluent oil is added to produce a product contain 2.5% manganese.

Component (B)

Component (B) of this invention is an anti-strip compound designed to reduce water-induced damage to asphalt paving mixtures. The function of any anti-stripping additive is to render the established adhesive bond between asphalt and aggregate stable against water in all its forms and under varying environmental and traffic conditions.

Water damage of asphalt paving mixtures has produced serious distress, reduced performance and increased maintenance for pavements in many parts of the United States. Good adhesion between the asphalt film and the aggregate surface is necessary for successful asphalt pavement. Anti-strip products can provide the solution to those problems through superior performance.

Component (B) is prepared by reacting a tall oil acid with an amine or polyamine.

The amines useful for reacting with the tall oil acids are characterized by the presence within their structure of at least one H—N<group. These amines can be monoamines or polyamines. Mixtures of two or more amines can be used in the reaction with one or more of the acylating agents of the present invention. Preferably, the amine contains at least one primary amino group (i.e., —NH$_2$). Advantageously, the amine is a polyamine, especially a polyamine containing at least two H—N groups, either or both of which are primary or secondary amines. The use of polyamines result in carboxylic derivative compositions which are usually more effective as dispersant/detergent additives, than are derivative compositions derived from monoamines. Suitable monoamines and polyamines are described in greater detail hereinafter.

The monoamines and polyamines useful in this invention are characterized by the presence within their structure of at least one H—N<group. Therefore, they have at least one primary (i.e., H$_2$N—) or secondary amino (i.e., H—N—) group. The amines can be aliphatic, cycloaliphatic, aromatic, or heterocyclic, including aliphatic-substituted aromatic, aliphatic-substituted cycloaliphatic, aliphatic-substituted aromatic, aliphatic-substituted heterocyclic, cycloaliphatic-substituted aliphatic, cycloaliphatic-substituted aromatic, cycloaliphatic-substituted heterocyclic, aromatic substituted aliphatic, aromatic-substituted cycloaliphatic, aromaticsubstituted heterocyclic, heterocyclic-substituted aliphatic, heterocyclic-substituted cycloaliphatic, and heterocyclic-substituted aromatic amines and may be saturated or unsaturated. If unsaturated, the amine is preferably free from acetylenic unsaturation (i.e., —C≡C—). The amines may also contain nonhydrocarbon substituents or groups as long as these groups do not significantly interfere with the reaction of the amines with the acylating reagents of this invention. Such non-hydrocarbon substituents or groups include lower alkoxy; lower alkyl mercapto, nitro, interrupting groups such as —O— and —S— (e.g., as in such groups as —CH$_2$CH$_2$—X—CH$_2$CH$_2$ where X is —O— or —S—).

With the exception of the branched polyalkylene polyamines, the polyoxyalkylene polyamines and the high molecular weight hydrocarbyl-substituted amines described more fully hereafter, the amines used in this invention ordinarily contain less than about 40 carbon atoms in total and usually not more than about 20 carbon atoms in total.

Aliphatic monoamines include mono-aliphatic and di-aliphatic substituted amines wherein the aliphatic groups can be saturated or unsaturated and straight or branched cahin. Thus, they are primary or secondary aliphatic amines. Such amines include, for example, mono- and di-alkyl-substituted amines, mono- and di-alkenylsubstituted amines, and amines having one N-alkenyl substituent and one N-alkyl substituent and the like. The total number of carbon atoms in these aliphatic monoamines preferably do not exceed about 40 and usually do not exceed about 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, and the like. Examples of cycloaliphatic-substituted aliphatic amines, aromatic-substituted aliphatic amines, and heterocyclic-substituted aliphatic amines, include 2-(cyclohexyl)-ethylamine, benzylamine, phenylethylamine, and 3-(furylpropyl)amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentenylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine.

Suitable aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthylene. Examples of aromatic monoamines include aniline, di(-para-methylphenyl)amine, naphthylamine, N-(n-butyl-) aniline, and the like. Examples of aliphatic-substituted aromatic monoamines are para-ethoxyaniline, para-dodecylaniline, cyclohexyl-substituted naphthylamine, and thienyl-substituted aniline.

Suitable polyamines are aliphatic, cycloaliphatic and aromatic polyamines analogous to be above-described monoamines except for the presence within their structure of another amino nitrogen. The other amino nitrogen can be a primary, secondary or tertiary amino nitrogen. Examples of such polyamines include N-aminopropyl-cyclohexylamines, N,N'-di-n-butyl-para-phenylene diamine, bis-1(para-aminophenyl)-methane, 1,4-diaminocyclohexane, and the like.

Heterocyclic mono- and polyamines can also be used in making the substituted carboxylic acid acylating agent derivative compositions of this invention. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the hterocyclic mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed about 20. Heterocyclic amines can contain heteroatoms other than nitrogen, especially oxygen and sulfur. Obviously they can contain more than one nitrogen heteroatom. The five- and six-membered heterocyclic rings are preferred.

Among the suitable heterocyclics are aziridines, azetidines, azolidines, terra- and di-hydro pyridines, pyrroles, indoles, piperadines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra, di- and perhydro-derivatives of each of the above and mixtures of two or more of these heterocyclic amines. Preferred heterocyclic aines are the saturated 5- and 6-membered heterocyclic amines containing only nitrogen, oxygen and/or sulfur in the hetero ring, especially the piperidines, piperazines, thiomorpholines, morpholines, pyrrolidines, and the like. Piperidine, aminoalkyl-substituted piperidines, piperazine, aminoalkyl-substituted piperazines, morpholine, aminoalkyl-substituted morpholines, pyrrolidine, and aminoalkyl-substituted pyrrolidines are especially preferred. Usually the aminoalkyl substituents are substituted on a nitrogen atom forming part of the hetero ring. Specific examples of such heterocyclic amines include N-aminopropylmorpholine, N-aminoethylpiperazine, and N,N'-di-aminoethylpiperazine.

The term "hydrocarbyl" (and cognate terms such as hydrocarbyloxy, hydrocarbylmercapto, etc) is used herein to include substantially hydrocarbyl groups (for example, substantially hydrocarbyloxy, substantially hydrocarbylmercapto, etc.), as well as purely hydrocarbyl groups. The description of these groups as being substantially hydrocarbyl means that they contain no non-hydrocarbyl substituents or non-carbon atoms which significantly affect the hydrocarbyl characteristics or properties of such groups relevant to their uses as described herein. For example, in the context of this invention, a purely hydrocarbyl $C_{40}$alkyl group and a $C_{40}$alkyl group substitued with a methoxy substituent are substantially similar in their properties with regard to their use in this invention and would be hydrocarbyl.

Non-limiting examples of substituents which do not significantly alter the hydrocarbyl characeristics or properties of the general nature of the hydrocarbyl groups of this invention are the following: Ether groups (especially hydrocarbyloxy such as phenoxy, benzyloxy, methoxy, n-butoxy, etc., and particularly alkoxy groups of up to ten carbon atoms); oxo groups (e.g., —O— linkages in the main carbon chain); nitro groups; thioether groups (especially $C_{1-10}$alkyl thioether); thia groups (e.g., —S— linkages in the main carbon chain); carbohydrocarbyloxy groups (e.g.,

hydrocarbyl); sulfonyl groups (e.g.,

hydrocarbyl); sulfinyl groups (e.g.,

hydrocarbyl).

This list is intended to be merely illustrative and not exhaustive, and the omission of a certain class of substituent is not meant to require its exclusion. In general, if such substituents are present, there will not be more than two for each ten carbon atoms in the substantially hydrocarbyl group and preferably not more than one of each ten carbon atoms since this number of substituents usually will not substantially affect the hydrocarbyl characteristics and properties of the group. Nevertheless, the hydrocarbyl groups usually will be free from non-hydrocarbon groups due to economic considerations; that is, they will be purely hydrocarbyl groups consisting of only carbon and hydrogen atoms.

The high molecular weight hydrocarbyl amines, both monoamines and polyamines, which can be used as amines in this invention are generally prepared by reacting a chlorinated polyolefin having a molecular weight of at least about 400 with ammonia or amine. Such amines are known in the art and described, for example, in U.S. Pat. Nos. 3,275,554 and 3,438,757, both of which are expressly incorporated herein by reference for their disclosure in regard to how to prepare these amines. All that is required for use of these amines is that they possess at least one primary or secondary amino group.

Another group of amines suitable for use in this invention are branched polyalkylene polyamines. The branches polyalkylene polyamines are polyalkylene polyamines wherein the branched group is a side chain containing on the average at least one nitrogen-bonded aminoalkylene

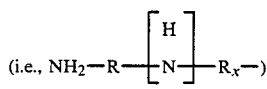

VI group per nine amino units present on the main chain, for example, 1–4 of such branched chains per nine units on the main chain, but preferably one side chain unit per nine main primary amino groups and at least one tertiary amino group.

These reagents may be expressed by the formula:

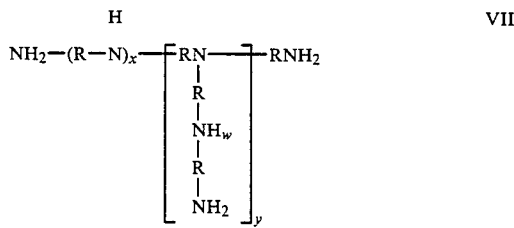

VII wherein R is an alkylene group such as ethylene, propylene, butylene and other homologs (both straight chained and branched), etc., but preferably ethylene; and x, y and w are integers, x being, for example, from 4 to 24 or more but preferably 6 to 18, y being, for example, 1 to 6 or more but preferably 1 to 3, and w being, for example, 0–6 but preferably 0–1. The x and y units may be sequential, alternative, orderly or randomly distributed.

The preferred class of such polyamines include those of the formula:

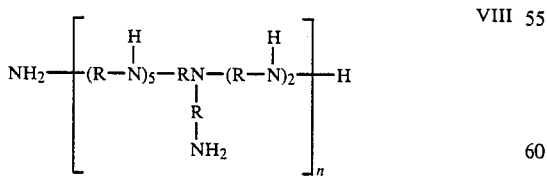

VIII wherein n is an integer, for example, 1–20 or more but preferably 1–3, and R is preferably ethylene, but may be propylene, butylene, etc. (straight chained or branched).

The preferred embodiments are presented by the following formula:

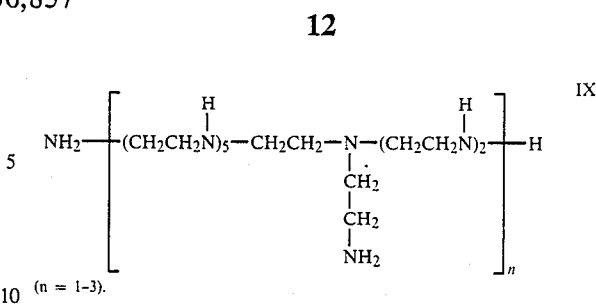

IX (n = 1–3).

The radicals in the brackets may be joined in a head-to-head or a head-to-tail fashion. Compounds described by this formula wherein n=1−3 are manufactured and sold as Polyamines N-400, N-800, N-1200, etc. Polyamine N-400 has the above formula wherein n=1.

U.S. Pat. Nos. 3,200,106 and 3,259,578 are incorporated herein by reference for their disclosure of how to make such polyamines and processes for reacting them with carboxylic acid acylating agents.

Suitable amines also include polyoxyalkylene polyamines, e.g., polyoxyalkylene diamines and polyoxyalkylene triamines, having average molecular weights ranging from about 200 to 4000 and preferably from about 400 to 2000. Illustrative examples of these polyoxyalkylene polyamines may be characterized by the formulae:

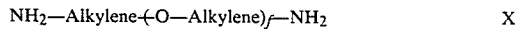

X where f has a value of about 3 to 70 and preferably about 10 to 35; and

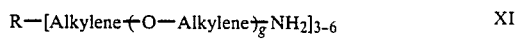

XI wherein g is such that the total value is from about 1 to 40 with the proviso that the sum of all of the g's is from about 3 to about 70 and generally from about 6 to about 35, and R is a polyvalent saturated hydrocarbyl radical of up to ten carbon atoms having a valence of 3 to 6. The alkylene groups may be straight or branched chains and contain from 1 to 7 carbon atoms, and usually from 1 to 4 carbon atoms. The various alkylene groups present within the above formulae may be the same or different.

More specific examples of these polyamines include:

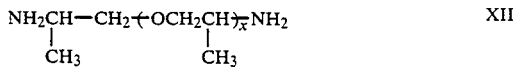

XII wherein x has a value of from about 3 to 70 and preferably from about 10 to 35 and:

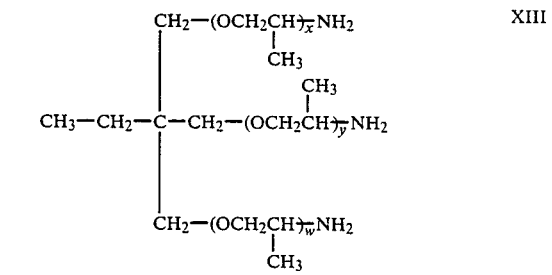

XIII wherein x+y+w have a total value ranging from about 3 to 30 and preferably from about 5 to 10.

Preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeff-amines D-230, D-400, D-1000, D-2000, T-403, etc".

U.S. Pat. Nos. 3,804,763 and 3,948,800 are incorporated herein by reference for their disclosure of such polyoxyalkylene polyamines.

Preferred amines are the alkylene polyamines, including the polyalkylene polyamines, as described in more detail hereafter. The alkylene polyamines include those conforming to the formula:

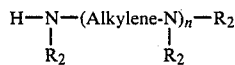
XIV wherein n is from 1 to about 10; each $R_2$ is independently a hydrogen atom, a hydrocarbyl group or a hydroxy-substituted hydrocarbyl group having up to about 30 atoms, and the "Alkylene" group has from about 1 to about 10 carbon atoms but the preferred alkylene is ethylene or propylene. Especially preferred are the alkylene polyamines where each $R_2$ is hydrogen with the ethylene polyamines mixtures of ethylene polyamines being the most preferred. Usually n will have an average value of from about 2 to about 7. Such alkylene polyamines include methylene polyamines, ethylene polyamines, butylene polyamines, propylene polyamines, pentylene polyamines, hexylene polyamines, heptylene polyamines, etc. The higher homologs of such amines and related aminoalkyl-substituted piperazines are also included.

Alkylene polyamines useful include ethylene diamine, triethylene tetramine, propylene diamine, trimethylene diamine, hexamethylene diamine, decamethylene diamine, octamethylene diamine, di(heptamethylene)triamine, tripropylene tetramine, tetraethylene pentamine, trimethylene diamine, pentaethylene hexamine, di(-trimethylene)triamine, N-(2-aminoethyl)piperazine, 1,4-bis(2-aminoethyl)piperazine, and the like. Higher homologs as are obtained by condensing two or more of the above-illustrated alkylene amines are useful as amines in this invention as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27-39, Interscience Publishers, Division of John Wiley and Sons, 1965, which is hereby incorporated by reference for their disclosure of useful polyamines. Such compounds are prepared most conveniently by the reaction of an ethylene imine with a ring-opening reagent such as ammonia, etc. These reactions result in the production of the somewhat complex mixtures of alkylene polyamines, including cyclic condensation products such as piperazines.

Other useful types of polyamine reactant mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than two, usually less than 1% by weight material boiling below about 200° C. In the instance of ethylene polyamine bottoms, which are readily available and found to be quite useful, the bottoms contain less than about 2% by weight total diethylene triamine (DETA) or triethylene tetramine (TETA). A typical sample of such ethylene polyamine bottoms obtained from the Dow Chemical Company of Freeport, Texas designated "E-100" showed a specific gravity at 15.6° C. of 1.0168, a percent nitrogen by weight of 33.15 and a viscosity at 40° C. of 121 centistokes. Gas chromatography analysis of such a sample showed it to contain about 0.93% "Light Ends" (DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylene triamine, triethylene tetramine and the like.

Another class of high molecular weight polyamines having utility when reacted with tall oil acids are illustrated by the following formula:

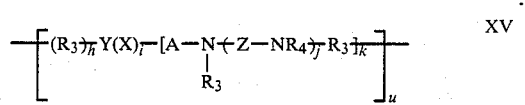
XV wherein $R_3$ is independently hydrogen or hydrocarbyl, $R_4$ is hydrogen, alkyl or $NH_2R_5[NR_5]_y$ wherein y ranges from 1 to about 6 and $R_5$ is an alkylene group of 1 to about 10 carbon atoms, X is an alkylene group of at least 1 carbon atom, the Y represents sulfur, nitrogen, or oxygen, A is hydrocarbyl, Z is alkylene of 1 to about 10 carbon atoms, a heterocyclic nitrogen containing cycloalkylene or oxyalkylene of 1 to about 10 carbon atoms, and wherein h is 0 or 1 dependent upon k and i, where i is 0 or 1, k is 1, 2 or 3, x is 1 to about 10 with the proviso that X and A combined must consist of at least 2 carbon atoms and where u is a whole integer greater than one. The above described polyamines, as illustrated by Formula XV, are derived from:

(A) an hydroxy alkyl or hydroxy aryl reactant represented by Formula XVI below:

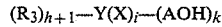
XVI wherein $R_3$, Y, X, A, h, i and k are the same as defined hereinabove, and (B) a polyamine reactant illustrated by the Formula XVII below:

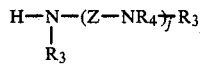
XVII wherein $R_3$, $R_4$, Z and j are the same as defined hereinabove.

The novel polyamine condensates of the present invention are prepared by the acid catalyzed condensation reaction of the hydroxy alkyl or hydroxy aryl reactant XVI with the amine reactant XVII at an elevated temperature.

The amine reactants, as represented by Formula XVII above, are characterized by the presence within their structure of the R-N < group wherein R is described hereinabove and are lower molecular weight polyamines. Mixtures of two or more amines can be used in the reaction with one or more hydroxy alkyl or hydroxy aryl reactants which are within the scope of this invention. The amine reactants of the present invention may contain aliphatic, cycloaliphatic, aromatic, or heterocyclic, including aliphatic-substituted aromatic, aliphatic-substituted heterocyclic, cycloaliphatic substituted aliphatic, cycloaliphatic-substituted aromatic, cycloaliphaticsubstituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclicsubstituted aromatic groups and may contain unsaturated sites in the molecule. If the amine contains such unsaturated sites, such unsaturation will not be acetylenic. These amines may also contain non-hydrocarbon substituents or groups as long as these groups do not significantly interfere with the reaction of the amines with the hydroxy alkyl or hydroxy aryl reactants of the invention. Such non-hydrocarbon substituents or groups include lower alkoxy, lower alkyl mercapto, nitro, interrupting groups such as —O— and —S— (e.g., as in such groups as —CH$_2$CH$_2$—X—CH$_2$CH$_2$— where X is a —O— or —S—).

Examples of suitable polyamine reactants according to the present invention include N-amino-propyl-cyclohexylamines, N-N'-di-n-butyl-para-phenylene diamine, bis-(para aminophenyl)methane, 1,4-diaminocyclohexane, and the like.

Heterocyclic polyamines can also be used as XVII in preparing the compositions of this invention. The terminology "heterocyclic polyamine(s)" is as discussed above.

The hydroxy alkyl and hydroxy aryl reactants as represented by Formula XVI hereinabove are preferably polyhydroxy material which will condense with the above discussed amine reactants and more preferably will condense to very high molecular weight materials as opposed to forming cyclic products. The hydroxy containing reactant may be selected from aliphatic, cycloaliphatic, and aryl based radicals wherein the radical is preferably an alkyl based radical and most preferably a hydroxyethyl radical. These hydroxy containing materials may contain other functional groups so long as they do not interfere with the condensation with the amine reactant or adversely affect the properties of the resultant high molecular weight polyamine condensate.

Aside from the above-discussed limitations on the hydroxy containing reactant, this reactant may be selected from numerous hydroxy containing compounds or species. Inclusive, but not exclusive thereof, of such hydroxy containing materials there may be mentioned polyalkylene polyols, alkylene glycols and polyoxyalkylene polyols such as polyoxyethylene polyols, polyoxypropylene polyols, polyoxybutylene polyols, and the like. These polyoxyalkylene polyols (sometimes called polyglycols) can contain up to about 150 oxyalkylene groups wherein the alkylene radical contains from 2 to about 8 carbon atoms. Such polyoxyalkylene polyols are generally dihydric alcohols. That is, each end of the molecule terminates with an —OH group. In order for such polyoxyalkylene alcohols to be useful as a reactant, there must be at least two such —OH groups. The monoethers of these alkylene glycols and polyoxyalkylene glycols are also useful as reactants. These include the monoaryl ethers, monoalkyl ethers, and monoaralkyl ethers of these alkylene glycols and polyoxyalkylene glycols. This group of alcohols may be represented by the general formula $$HO(R_AO)_pR_B—OR_C \qquad \text{XVIII}$$

wherein $R_C$ is aryl such as phenyl, lower alkoxy phenyl, or lower alkyl phenyl; lower alkyl such as ethyl, propyl, tert-butyl, pentyl, etc.,; and aralkyl such as benzyl, phenylethyl, phenylpropyl, p-ethyl-phenylethyl, etc.; p is zero to about 150, and $R_A$ and $R_B$ are lower alkylene of 2 to about 8 carbon atoms and, preferably, 2 to 4 carbon atoms. Polyoxyalkylene glycols where the alkylene groups are ethylene or propylene and p is at least two as well as the monoethers thereof as described above are considered very useful for the purposes of the present invention.

The aryl polyhydric alcohols useful as the hydroxy reactant include polyhydric phenols and naphthols, which are the preferred hydroxyaromatic compounds. These hydroxy-substituted aromatic compounds may contain other substituents in addition to the hydroxy substituents such as halo, alkyl, alkenyl, alkoxy, alkylmercapto, nitro and the like. Usually, the hydroxy aromatic compound will contain 1 to 4 hydroxy groups. The aromatic hydroxy compounds are illustrated by the following specific examples: beta-naphthol, p-nitrophenol, alpha-naphthol, cresols, resorcinol, catechol, thymol, eugenol, p,p'-dihydroxy-biphenyl, hydroquinone, pyrogallol, phloroglucinol, hexyl-resorcinol, orcinol, guaiacol, alpha-decylbeta-naphthol, the condensation product of heptyl phenol with 0.5 moles of formaldehyde, the condensation product of octylphenol with acetone, di(hydroxyphenyl) oxide, di(hydroxyphenyl)sulfide, di-(hydroxyphenyl) disulfide.

Other specific alcohols useful as the hydroxy containing reactant are the ether alcohols and amino alcohols including, for example, the oxyalkylene, oxy-arylene-, amino-alkylene-, and amino-arylene-substituted alcohols having one or more oxyalkylene, aminoalkylene or amino-aryleneoxy-arylene radicals. They are exemplified by Cellosolve, carbitol, mono-(heptylphenyloxypropylene)-substituted glycerol, poly(styreneoxide), aminoethanol, di(hydroxyethyl)amine, tri(hydroxypropyl)amine, N,N,N',N'-tetrahydroxytrimethylenediamine, and the like.

The polyhydric alcohol reactants of the present invention preferably contain from 2 to about 10 hydroxy radicals. They are illustrated, for example, by the alkylene glycols and polyoxyalkylene glycols mentioned above such as ethylene glycol, diethylene glycol, triethylene glycol, tetraethylene glycol, dipropylene glycol, tripropylene glycol, dibutylene glycol, tributylene glycol, and other alkylene glycols and polyoxyalkylene glycols in which the alkylene radicals contain 2 to about 8 carbon atoms.

A preferred class of alcohols suitable as reactant (XVI) are those polyhydric alcohols containing up to about 12 carbon atoms, and especially those containing 3 to 10 carbon atoms. This class of alcohols includes glycerol, erythritol, pentaerythritol, dipentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, 2,2,6,6-tetrakis-(hydroxymethyl)cyclohexanol, 1,10-decanediol, digitalose, and the like. Aliphatic alcohols containing at least three hydroxyl groups and up to five hydroxyl groups are particularly preferred.

Amino alcohols contemplated as suitable for use as the hydroxy containing reactant have two or more hydroxy groups. Examples of suitable amino alcohols are the N-(hydroxy-lower alkyl)amines and polyamines such as di-(2-hydroxyethyl)-amine, tri-(2-hydroxyethyl)-amine, N,N,N'-tri-(2-hydroxyethyl)ethylenediamine, N-(2-hydroxypropyl)-5-carbethoxy-2-piperidone, and ethers thereof with aliphatic alcohols, especially lower alkanols, N,N-di-(3-hydroxypropyl)glycine, and the like. Also contemplated are other poly-N-hydroxyalkyl-substituted alkylene polyamines wherein the alkylene polyamine are as described above; especially those that contain 2 to 3 carbon atoms in the alkylene radicals.

Polyoxyalkylene polyols which have two or three hydroxyl groups and molecules consisting essentially of hydrophobic portions comprising

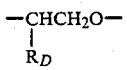

groups
wherein $R_D$ is lower alkyl of up to three carbon atoms and hydrophylic portions comprising —$CH_2CH_2O$— groups are a preferred hydroxy continuing reactant. Such polyols can be prepared by first reacting a compound of the formula $R_E \cdot (OH)_q$ where q is 2–3 and $R_E$ is hydrocarbyl with a terminal alkylene oxide of the formula

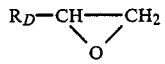

and then reacting that product with ethylene oxide. $R_E(OH)_q$ can also be, for example, (trimethylolpropane), (trimethylolethane), ethylene glycol, trimethylene glycol, tetramethylene glycol, tri-(beta-hydroxypropyl)amine, 1,4-(2-hydroxyethyl)-cyclohexane, (tris-(hydroxymethyl)amino methane, 2-amino-2-methyl-1,3-propane diol, N,N,N',N'-tetrakis (2-hydroxypropyl)ethylene diamine, N,N,N',N'-tetrakis (2-hydroxyethyl)-ethylene diamine, resorcinol, or one of the other illustrative examples mentioned hereinbefore. The foregoing described $R_E(OH)_1$ polyols may also be used alone as the hydroxy containing II reactant.

Other hydroxy containing reactants useful in the present invention are hydroxyalkyl, hydroxy alkyl oxyalkyl and hydroxy aryl sulfides of the formula $$S_m(R_FOH)_{2m} \qquad \text{XIX}$$

wherein m is 1 or 2 and $R_F$ is alkyl of 1 to about 10 carbon atoms alkyl oxyalkyl where alkyl is 1 to about 10 carbon atoms and preferably 2 to 4 carbon atoms, and aryl of at least 6 carbon atoms. For the purposes of the present invention, 2,2'-thiodiethanol and 2,2'-thiodipropanol are the preferred reactants for this class of hydroxy containing reactants.

As indicated previously, the reaction of the amine reactant with the hydroxy alkyl or hydroxy aryl reactant requires the presence of an acid catalyst. Those catalysts useful for the purpose of this invention include mineral acids (mono, di- and poly basic acids) such as sulfuric acid and phosphoric acid; organo phosphorus acids and organo sulfonic acids such as $R_6P(O)(OH)_2$ and $R_6SO_3H$, wherein $R_6$ is hydrocarbyl; alkali metal partial salts of $H_3PO_4$ and $H_2SO_4$, such as $NaHSO_4$, $LiHSO_4$, $KHSO_4$, $NaH_2PO_4$, $LiH_2PO_4$ and $KH_2PO_4$; alkaline earth metal partial salts of $H_3PO_4$ and $H_2SO_4$, such as $CaHPO_4$, $CaSO_4$ and $MgHPO_4$; also $Al_2O_3$ and Zeolites. Phosphoric acid is preferred because of its commercial availability and ease of handling. Also useful as catalysts for this invention are materials which generate acids when treated in the reaction mixture, e.g., triphenylphospite.

The reaction is run at an elevated temperature which, depending upon the particular reactants, can range from 60° C. to about 265° C. Most reactions, however, are run in the 220° C. to about 250° C. range. Furthermore, this reaction may be run at atmospheric pressure or optionally at a reduced pressure depending upon the particular reactants and the concomitant economics. The degree of condensation of the resultant high molecular weight polyamine prepared by the process of the present invention is limited only to the extent to prevent the formation of solid products under reaction conditions. The control of the degree of condensation of the product of the present invention is normally accomplished by limiting the amount of the condensing agent, i.e., the hydroxy alkyl or hydroxy aryl reactant charged to the reaction medium. In a preferred embodiment, the condensed high molecular weight polyamines of the present invention are pourable at room temperature and have viscosities which range from about 100% greater than the viscosity of the amine reactant (XVII) to about 6000% greater than the viscosity of the amine reactant (XVII). In a most preferred embodiment, the viscosity of these polyamines will range from about 50 cSt to about 200 cSt at 100° C. It is pointed out that the foregoing limitation on the degree of condensation of the products of the present invention is solely for the purpose of the ultimate end use of these materials in lubricant compositions. For other or related utilities, solid products of the condensation reaction described above may be desirable and thus the condensation may be carried out to result in high molecular weight solid products where this may be accomplished by adjusting the relative amounts of the respective reactants charged to the reaction medium.

The preparation of various high molecular weight polyamine condensates representative of products within the scope of the present invention is illustrated in the following examples. While these examples will show one skilled in the art how to operate within the scope of this invention, they are not to serve as a limitation on the scope of the invention where such scope is defined only in the claims. It is pointed out that in the following examples, and elsewhere in the present specification and claims, all percentages and all parts are intended to express percent by weight and parts by weight unless otherwise clearly indicated.

EXAMPLE B-1

A 4-necked, 500-ml, round-bottom flask equipped with glass stirrer, thermowell, subsurface $N_2$ inlet, Dean-Stark trap, and Friedrich condenser is charged with
(a) 201 grams of Tetraethylenepentamine (TEPA).
(b) 151 grams of 40% aqueous Tris(hydroxymethyl)aminomethane (THAM), and
(c) 3.5 grams of 85% $H_3PO_4$.

The mixture is heated to 120° C. over 1.0 hour. With N$_2$ sweeping, the mixture is heated to 130° C. over 1 hour and to 230° C. over 2 hours more. Held at 230°-240° C. for 4 hours and at 241°-250° C. for 3 hours. The product is cooled to 150° C. and filtered with diatomaceous earth filter aid.

EXAMPLE B-2

A 4-necked, 3-1, round-bottom flask equipped with glass stirrer, thermowell, subsurface N$_2$ inlet, Dean-Stark trap, and Friedrich condenser is charged with:
 (a) 1299 grams of HPA Taft Amines (amine bottoms).
 (b) 727 grams of 40% aqueous Tris(hydroxymethyl-)aminomethane (THAM).
The mixture is heated to 60° C. and 23 grams of 85% H$_3$PO$_4$ was added. The mixture is heated to 120° C. over 0.6 hr. With N$_2$ sweeping, the mixture is heated to 150° C. over 1.25 hr. and to 235° C. over 1 hr. more. Held at 230°-235° C. for 5 hr. Heated to 240° C. over 0.75 hr. and held at 240°-245° C. for 5 hr. The product is cooled to 150° C. and filtered with a diatomaceous earth filter aid. Yield: 84% (1221 grams).

EXAMPLE B-3

A 3-liter flask equipped with stirrer, thermowell, below surface N$_2$ inlet and a stripping condenser is charged with 363 grams of THAM and 1200 grams of TEPA. Next is added 16 grams of H$_3$PO$_4$ at 110° C. while blowing with N$_2$ at 0.25 cfh. The mixture is then heated to 220° C. in 0.8 hour and held at 220°-225° C. for 1.2 hour; then heated to 230° C. in 0.2 hour and held at 230° C. for 4.75 hours: 129g distillate collected. The mixture is then held at 242°-245° C. for 5 hours: 39g of additional distillate is collected in trap. Held at 246°-255° C. for 1.2 hr: 178 g material in trap; NNBbpb=170. The mixture is filtered at 155° C. using 45 g of a diatomaceous earth filter aid.

EXAMPLE B-4

A 3-liter flask equipped with stirrer, thermowell, below surface N$_2$ inlet and a stripping condenser is charged with 363 grams of THAM and 1200 grams of TEPA. 16 grams of H$_3$PO$_4$ is added at 100° C. while blowing with N$_2$ at 0.2 cfh. The mixture is heated to 165° C. in 0.4 hour; and to 241° C. in 0.6 hour. Held at 241°-243° C. for 0.3 hour. The contents are further heated to 250° C. for an additional 0.5 hour and held at 250° C. for 5.5 hour: 288 g of material is collected in the trap; NNBbpb=506. This material is filtered at 150° C. using 55 g of diatomaceous earth filter aid.

EXAMPLE B-5

A 1-liter flask equipped with stirrer, thermowell, below surface N$_2$ inlet and Dean-Stark trap is charged with 121 grams of THAM and 400 grams of TEPA. To this mixture is added 8.2 grams of KH$_2$PO$_4$ at 60° C. while blowing with N$_2$ at a 0.15 cfh. The reaction mixture is heated to 150° C. over 1 hour to 230° C. and over another 1.5 hours. The temperature is held at 230° C.-232° C. for 4.25 hour: 17 g material is collected in the trap. The heated mixture is allowed to stand and is held at 237° C. for 3.25 hour: 38 g material is collected in trap. The mixture is further heated to 241° C. over 0.75 hour and held at 241° C.-242° C. for 4.75 hr.: 50 g of material is collected in trap. The material is allowed to stand and then held at 250° C. for 5 hour: total of 53 g material collected in trap: NNBbph=96.5. The contents are filtered at 150° C. using 20g of diatomaceous earth filter aid.

EXAMPLE B-6

To a 500ml flask equipped with stirrer, thermowell, below surface N$_2$ inlet to Dean-Stark trap is charged 201 grams of TEPA and 468 grams of gylcerol. 2.3 grams H$_3$PO$_4$ is added at 80° C. while blowing with N$_2$ at 0.35 cfh. The mixture is heated to 220° C. over 2 hours; to 240° C. in 1 hour; to 245° C. in 1.5 hour and to 255° C. in 1 hour. The temperature is held at 255°-252° C. for 2 hours: 12 g material collected in trap. The mixture is allowed to stand and held at 255°-262° C. for 7 hours: 34 g material is collected in the trap. The temperature of the mixture is further held at 255°-260° C. for 1 hour more. A total of 36 g is collected in the trap: NNBbph=435. Contents are filtered at 130° C. using 23 g of diatomaceous earth filter aid.

EXAMPLE B-7

To a 500 ml flask equipped with stirrer, thermowell, below surface N$_2$ inlet and Dean-Stark trap is charged 201 grams of TEPA and 45 grams of hexaglycerol. To this mixture 3.5 grams of H$_3$PO$_4$ is added at 85° C. while blowing with N$_2$ at 0.35 cfh. The mixture is heated to 245° C. over 0.7 hour and held at 245° C.-260° C. for 1.75 hour: 10 g of material is collected in the trap. The mixture is allowed to stand and held at 260° C.-270° C. for 7.5 hour: total of 27 g of material is collected in the trap: NNBbph=645. The contents are filtered at 125° C. using 20 g of diatomaceous earth filter aid.

EXAMPLE B-8

To a 3-liter flask equipped with a stirrer, thermowell, below surface N$_2$ inlet tube is charged 400 parts of a mixture of ethylenepolyamines. The contents are heated to 26°-38° C. and added is 708 parts of tall oil acid over a 2 hour period. N$_2$ is blown below the surface at 0.5 cfh while increasing the temperature to 220° C. over 8 hours. The contents are held at 220° C. over an additional 8 hours while obtaining 774 parts of distillate. The contents are filtered using 10 g of diatomaceous earth filter aid.

Components (A) and (B) may be premixed with one another prior to their incorporation into the asphalt cement, or Components (A) and (B) may be incorporated individually into the asphalt cement.

A preferred concentration level of Components (A) and (B) is not more than 90% Component (A) and at least 10% Component (B). A more preferred concentration level is not more than 80% Component (A) and at least 20% Component (B). The most preferred concentration level is not more than 70% Component (A) and at least 30% Component (B).

Generally, the premixed components will be mixed with asphalt in the fluid or molten condition to dissolve or disperse the components in the asphalt. Generally, the asphalt is heated to an elevated temperature to improve the fluidity of the asphalt. Temperatures of from about 100°-225° C. are sufficient although the precise temperature for any particulr asphalt will depend on the source and nature of the asphalt material.

The amount of the components in the modified asphalt compositions of the present invention is an amount which is sufficient to reduce or retard degradation of the asphalt concrete in service. In one embodiment, the amount will vary from as little as 0.5% up to about 5% or more of Component (A) with 0.1% up to about 2% or more of Component (B) based on the weight of the asphalt. Generally, however, the amount of Component (A) and Component (B) separately will be less than about 10% by weight of the weight of the asphalt. Most often, the amount of Component (A) and Component (B) separately incorporated in the asphalt will range from about 0.2 to about 3% or 5% by weight.

When mixing the composition comprising Component (A) and Component (B) of the present invention with the asphalt material, the asphalt should be at an elevated temperature and in a flowable fluid state. By way of example, a suitable temperature is one at which the bitumen or asphalt is thinner than molasses at ambient temperature, typically thicker than water, and is flowable or pourable without stirring. Thus, a quantity of the asphalt should be sufficiently fluid to flow when placed on a solid surface. This is particularly advantageous if it is contemplated that the asphalt cement would be circulated under high speed agitation to provide a uniform dispersion or solution.

To accomplish the foregoing solution or dispersion, for a conventional asphalt cement (e.g., one designated AC-20 by the Asphalt Institute, a suitable mixing temperature is on the order of a minimum of about 100° C. for soft asphalt, and, preferably, on the order of 120° C. or more. At temperatures below this level, mixing times for total dispersion, even if feasible, become excessive economically. On the other hand, the temperature of mixing should not be so high as to promote other reactions which could harm the asphalt material. For this reason, it is preferred not to heat the asphalt cement above about 225° C., and thus, suitable mixing temperatures are from about 100° C. to about 225° C. with a preferred mixing temperature of from 120°–180° C. depending upon the type of asphalt and the mixing times and speeds. At temperatures on the order of 170° C., 20 to 30 minutes are sufficient under conventional mechanical stirring speeds as with an impeller type stirrer. On the other hand, mixing times as low as several minutes may be sufficient under certain circumstances. In some instances, it may be desirable to perform the mixing step under an inert gas atmosphere such as nitrogen. The use of nitrogen precludes the presence of oxygen at elevated temperatures which tends to harden the final product.

The modified asphalt compositions of the present invention are particularly useful for preparing asphalt coating compositions, and particularly for preparing improved aggregate-containing asphalts such as employed in the paving of roads, bridges, airport runways, sidewalks, etc. The modified asphalt compositions of the present invention in fluid form are mixed generally with preheated, predried aggregates to form the homogeneous mixture of uniformly coated aggregates in a paving composition, typically as performed at an asphalt mixing plant. The aggregate preferably is heated under conditions of time and temperature to drive off essentially all free moisture prior to mixing. During mixing, both the aggregate and the modified asphalt are typically at temperatures of about 100°–160° C.. Before the composition is cooled to a temperature at which it looses its workability, the composition is spread on a road bed, compacted and permitted to cure. After curing, the road comprises aggregate bound by a matrix of modified asphalt binder.

The modified asphalt compositions of the present invention may also be useful for preparing improved seal coats. A seal coat is generally applied as a hot asphalt cement, cutback asphalt cement, or emulsified asphalt cement. The seal coat is generally applied at a rate of about 0.05 to about 0.8 gallons per square yard of surface. The preferred application rate is about 0.35 gallons per square yard of surface. The liquid material is generally sprayed from a truck. The aggregate is placed on top of the asphalt cement. Rolling or compacting the aggregate into the asphalt cement finishes the application.

The function of the seal coat is to prevent damage to paving surfaces by providing a barrier to exclude the admittance of moisture to the underlying surfaces. The useful function of the addition of Components (A) and (B) to this barrier is determined by the physical/chemical nature of the polymer modifying the consistency of the asphalt cement. This consistency can be defined as incorporating viscosity, stickiness, ductibility and flexibility.

The modified asphalt compositions of the present invention, after formation, may be handled by conventional techniques to maintain them in fluid form under road-building conditions. For example, the modified asphalts may be formed into a cutback by fluxing the asphalt with a suitable volatile solvent or distillate. The modified asphalt cutback may then be directly mixed with aggregate and applied as a paving composition in fluid form, possibly at ambient temperatures. Another conventional technique for fluidizing the modified asphalt cement prior to mixing with aggregate and forming into a paving composition is to emulsify the modified asphalt by known techniques. An advantage of this method of fluidizing is that after mixing with the aggregate, it may be applied as a paving composition at ambient temperature. In addition to the above, the modifier may be added to a previously prepared asphalt cutback or asphalt emulsion.

The term "aggregate" as used in the specification and claims is intended to include solid particles having a range of sizes including fine particles such as sand to relatively coarse particles such as crushed stone, gravel or slag. The breakdown of Texas pea gravel aggregate is as follows:

| Gradation | (% Passing) |
|-----------|-------------|
| ½"        | 100         |
| ⅜"        | 98          |
| #4        | 71          |
| #10       | 46          |
| #40       | 30          |
| #80       | 7.8         |
| #200      | 1.0         |

The above aggregate has a composition of 52.5% Pea Gravel, 14.3% screenings and 28.6% sand.

The ratio of aggregate to modified bitumen or asphalt depends upon their properties and the desired end use. For typical road paving compositions, the paving composition will comprise a minimum of about 85% by weight of aggregate, and generally between about 90–96% by weight of the total paving composition will be aggregate. The paving composition also comprises a minimum of about 3% by weight asphalt cement, 0.015% by weight Component (A) and 0.005% by weight Component (B). A more preferable paving composition comprises a minimum of 3% by weight asphalt cement, 0.04% by weight Component (A) and 0.015% by weight Component (B).

Aggregate containing modified asphalt compositions can be prepared in accordance with the present invention by techniques known to the art. In one method, a modified asphalt cement is prepared in accordance with the method of the present invention, and the modified asphalt cement thereafter is mixed with an aggregate at an elevated temperature to form the desired paving composition.

The modified asphalt compositions of the present invention, and the aggregate containing asphalt compositions prepared utilizing the modified asphalt compositions of the present invention are characterized by an ability to retain their desirable characteristics in service.

The following examples illustrate the modified asphalt compositions and aggregate-containing compositions of the present invention. All parts are parts by weight.

| Example | A | B | C | D | E | F |
|---|---|---|---|---|---|---|
| Product of Example A-1 | 75 | 60 | 67 | 71 | 78 | 87.5 |
| Product of Example B-8 | 25 | 40 | 33 | 29 | 22 | 12.5 |

EXAMPLE 1

A Cosden AC-20 asphalt cement meeting the specification of AASHTO AC-20 is modified with 4% by weight based on the weight of the asphalt of the product of Example A by thoroughly mixing the product of Example A with the fluidized asphalt. The modified asphalt cement is then incorporated into a Texas Pea gravel aggregate such that the asphalt content is 4.6%.

EXAMPLE 2

The procedure of Example 1 is followed except that 3% of the product of Example A is incorporated into the asphalt cement.

EXAMPLE 3

The procedure of Example 1 is followed except that 3% of the product of Example B is incorporated into the asphalt cement.

EXAMPLE 4

The procedure of Example 1 is followed except that 3% of the product of Example C is incorporated into the asphalt cement.

EXAMPLE 5

The procedure of Example 1 is followed except that 3% of the product of Example D is incorporated into the asphalt cement.

EXAMPLE 6

The procedure of Example 1 is followed except that 3% of the product of Example E is incorporated into the asphalt cement.

EXAMPLE 7

The procedure of Example 1 is followed except that 4% of the product of Example F is incorporated into the asphalt cement.

TABLE I

| | Marshall Stability | | | | |
|---|---|---|---|---|---|
| | Initial | | Cured [2] | | |
| | Stability lbs. | Flow 0.01 in | Stability lbs. | Flow 0.01 in | Voids |
| Control [1] (avg. of 2 runs) | 389 | 10 | 644 | 8 | 7 |
| Product of Example 1 (avg. of 2 runs) | 561 | 8 | 1691 | 8.5 | 7 |

The Lottman test is an industry-recognized paving test that measures water susceptibility.

TABLE II

| | Lottman Test Procedure | | |
|---|---|---|---|
| | Dry Strength PSI | Wet Strength PSI | Wet/Dry Ratio (%) |
| Control [1] (avg. of 2 runs) | 128.6 | 55.1 | 42.9 |
| Product of Example 2 (avg. of 2 runs) | 164.5 | 120.1 | 73 |

TABLE III

| | Lottman Test Procedure | | |
|---|---|---|---|
| | Dry Strength PSI | Wet Strength PSI | Wet/Dry Ratio (%) |
| Control [1] (avg. of 2 runs) | 159.8 | 64 | 40 |
| Product of Example 7 (avg. of 2 runs) | 157 | 98.3 | 62.7 |

[1] In all cases the control sample is 4.6% asphalt cement in Texas pea gravel aggregate.
[2] Cured 9 days at 60° C.

What is claimed is:
1. An additive composition comprising:
(A) not more than 90 weight percent of a metallic organic strength improving compound, wherein the metal is selected from the group consisting of manganese, cobalt, copper, vanadium, molybdenum, cerium, iron, nickel, lead, zirconium, barium, calcium and zinc, and wherein the organic part of said metallic organic compound is derived from one or more organic compounds selected from the group consisting of carboxylic acids, phenols and ketones either alone or in combination with other metallic organic compounds; and
(B) at least 10 weight percent of an anti-strip compound prepared by reacting tall oil acid with an amine or polyamine containing at least one HN< group.

2. An asphalt additive composition according to claim 1, wherein the metal of said metallic organic compound is manganese.

3. An asphalt additive composition according to claim 1, wherein said metallic organic compound is manganese tallate.

4. An asphalt additive composition according to claim 1, wherein said metallic organic compound is represented by the formula:

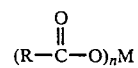

wherein R is an aliphatic, cycloaliphatic or aromatic group; M is manganese, or copper; and n is equal to the valence of M.

5. An asphalt additive composition according to claim 4, wherein R is as previously defined; n is 2, and M is manganese.

6. An asphalt additive composition according to claim 1, wherein said polyamine is selected from the group consisting of polyoxyalkylene polyamines, coupled polyamines and condensed polyamines.

7. An asphalt additive composition according to claim 6, wherein the polyoxyalkylene polyamines are selected from the group consisting of polyoxyethylene diamines, polyoxypropylene diamines and polyoxypropylene triamines.

8. An asphalt additive composition according to claim 6, wherein said anti-strip compound is selected from the group consisting of ethoxylated polyamines.

9. An asphalt additive composition according to claim 6, wherein said polyamine is selected from the group consisting of coupled polyamines.

10. An asphalt additive composition according to claim 6, wherein said polyamine is selected from the group consisting of condensed polyamines.

11. An asphalt additive composition according to claim 1, wherein said anti-strip compound is present in a concentration of at least twenty weight percent.

12. An asphalt additive composition according to claim 1, wherein said anti-strip compound is present in a concentration of at least forty weight percent.

13. An asphalt additive composition according to claim 1, wherein said anti-strip compound is present in a concentration of at least fifty weight percent.

14. An asphalt additive composition according to claim 1, wherein said metallic organic compound is a manganese containing compound and said anti-strip agent is prepared by reacting tall oil acid with an amine or polyamine.

15. An asphalt additive composition according to claim 1, wherein said metallic organic compound is manganese tallate and said anti-strip agent is prepared by reacting tall oil acid with an amine or polyamine.

16. An asphalt additive composition according to claim 1, wherein said metallic organic compound is a manganese containing compound and said anti-strip compound is selected from the group consisting of ethoxylated polyamines, coupled polyamines and condensed polyamines.

17. An asphalt additive composition according to claim 15, wherein said metallic organic compound is manganese tallate and said anti-strip compound is selected from the group consisting of ethoxylated polyamines, coupled polyamines and condensed polyamines.

18. An asphalt additive composition according to claim 5, wherein said metallic organic compound is manganese tallate present in at least 80% by weight and said anti-strip agent is present in a concentration of at least 20% by weight.

19. An asphalt additive composition according to claim 5, wherein said composition also contains at least one cobalt organic compound or at least one copper organic compound.

20. A composition comprising:
(A) at least 90% by weight asphalt cement;
(B) an asphalt soluble metallic organic compound wherein the metal is selected from the group consisting of manganese, cobalt, copper, vanadium, molybdenum, cerium, iron, nickel, lead, zirconium, barium, calcium and zinc, and wherein the organic part of said metallic organic compound is derived from one or more organic compounds selected from the group consisting of carboxylic acids, phenols and ketones wherein said asphalt soluble metallic organic compound is present in a concentration of at least 0.5% by weight; and,
(C) an anti-strip agent prepared by reacting tall oil acid with an amine or polyamine containing at least one HN< group wherein said anti-strip agent is present in a concentration of at least 0.1% by weight.

21. A paving composition comprising:
(A) at least 85% by weight aggregate;
(B) at least 3% by weight asphalt cement;
(C) an asphalt soluble metallic organic compound wherein the metal is selected from the group consisting of manganese, cobalt, copper, vanadium, molybdenum, cerium, iron, nickel, lead, zirconium, barium, calcium and zinc, and wherein the organic part of said metallic organic compound is derived from one or more organic compounds selected from the group consisting of carboxylic acids, phenols and ketones wherein said asphalt soluble metallic organic compound is present in a concentration of at least 0.015% by weight; and,
(D) an anti-strip agent prepared by reacting tall oil acid with an amine or polyamine containing at least one HN<group wherein said anti-strip agent is present in a concentration of at least 0.005% by weight.

22. A paving composition according to claim 21, wherein said asphalt soluble metallic organic compound is present in a concentration of 0.04% by weight and said anti-strip agent is present in a concentration of at least 0.015% by weight.

23. A method for improving the strength, stability and water resistance of asphalt concrete pavements which comprises adding to the asphalt cement the asphalt additive composition of claim 1.

24. An asphalt additive composition comprising
(A) not more than 90 weight percent of a manganese salt of an aliphatic carboxylic acid; and
(B) at least 10 weight percent of an anti-strip compound prepared by reacting tall oil acid with a polyamine compound containing at least one HN<group.

25. The asphalt additive composition of claim 24 wherein the polyamine comprises a mixture of ethylene polyamines.

26. The asphalt additive composition of claim 24 wherein the manganese salt is manganese tallate.

27. A composition comprising
(A) at least 90 weight percent of asphalt cement;
(B) at least 0.5 weight percent of a manganese salt of an aliphatic carboxylic acid; and
(C) at least 0.1 weight percent of an anti-strip agent prepared by reacting tall oil acid with a polyamine containing at least one HN<group.

28. The composition of claim 27 wherein the manganese salt of (B) is manganese tallate.

29. The composition of claim 27 wherein the anti-strip agent (C) is prepared by reacting tall oil acid with a mixture of ethylene polyamines.

30. A paving composition comprising
(A) at least 85 weight percent aggregate;
(B) at least 3 weight percent asphalt cement;

(C) at least 0.015 weight percent of a manganese salt of an aliphatic carboxylic acid; and
(D) at least 0.005 weight percent of an anti-strip agent prepared by reacting tall oil acid with a polyamine containing at least one NH< group.

31. The paving composition of claim 30 wherein the manganese salt of (C) is manganese tallate.

32. The paving composition of claim 30 wherein the anti-strip agent (D) is prepared by reacting tall oil acid with a mixture of ethylene polyamines.

* * * * *